United States Patent [19]

Yan et al.

[11] 4,049,539

[45] Sept. 20, 1977

[54] TWO-STAGE PROCESS FOR UPGRADING NAPHTHA

[75] Inventors: Tsoung Y. Yan; Tracy J. Huang; Werner O. Haag, all of Trenton, N.J.

[73] Assignee: Mobil Oil Corporation, New York, N.Y.

[21] Appl. No.: 586,850

[22] Filed: June 13, 1975

[51] Int. Cl.² ............................................. C10G 39/00
[52] U.S. Cl. ................................ 208/65; 260/683.74; 208/49
[58] Field of Search .......................... 208/65, 49, 141; 260/683.74, 683.47, 683.68

[56] References Cited

U.S. PATENT DOCUMENTS

| | | | |
|---|---|---|---|
| 2,664,386 | 12/1953 | Haensel | 208/65 |
| 2,758,064 | 8/1956 | Haensel | 208/65 |
| 2,965,560 | 12/1960 | Smith | 208/65 |
| 2,970,955 | 2/1961 | Clark | 260/683.74 |
| 3,177,135 | 4/1965 | Lang et al. | 208/141 |
| 3,502,569 | 3/1970 | Hervert | 208/141 |
| 3,816,294 | 6/1974 | Wilson et al. | 260/683.74 |
| 3,933,619 | 1/1976 | Kozlowski | 208/141 |
| 3,974,061 | 8/1976 | Quisenberry | 208/65 |

*Primary Examiner*—Delbert E. Gantz
*Assistant Examiner*—James W. Hellwege
*Attorney, Agent, or Firm*—C. A. Huggett; R. W. Barclay; C. E. Setliff

[57] ABSTRACT

Naphthas are upgraded in a two-stage process to give improved yields of high octane gasoline. The first stage operates at low temperatures of 100°–300° F using a highly active chlorinated alumina containing a metal of the platinum group, while the second stage operates at high temperatures using a reforming catalyst.

10 Claims, No Drawings

TWO-STAGE PROCESS FOR UPGRADING NAPHTHA

BACKGROUND OF THE INVENTION

1. Field of the Invention

This invention relates to a process for reforming naphtha in a two-stage process. More particularly, the invention is concerned with a process in which in the first two stages a highly chlorinated alumina catalyst containing a metal of the platinum group is used, and in the second stage the effluent is reformed in the presence of a platinum containing reforming catalyst.

2. Discussion of the Prior Art

The term "reforming" is well known in the petroleum industry and refers to the treatment of gasoline or fractions thereof to improve their anti-knock characteristics. The reforming process involves many reactions not all of which are entirely understood or even known. The primary known reactions comprise controlled or selective cracking and aromatization, the latter including dehydrogenation of naphthenic hydrocarbons to aromatics and the cyclization of straight chain or mildly branched chain aliphatic hydrocarbons of at least six carbon atoms to form aromatics. Other reactions occurring during reforming include isomerization, both of aliphatic hydrocarbons and of naphthenic hydrocarbons containing 5 and 6 carbon atoms in the ring, hydrogen transfer reactions, alkyl transfer reactions, and the like.

In the reforming process of naphthenic compounds, both cyclohexanes and cyclopentanes are converted to aromatic compounds to obtain high octane reformate. In reforming, the cyclohexanes can be converted to aromatics via simple, clean dehydrogenation reactions, while the cyclopentanes have to be first isomerized then dehydrogenated to yield aromatics. In comparison with cyclohexanes, reactions of cyclopentanes to aromatics are not only slower, but also lead to undesirable side reactions, as for example, cracking to light gases, resulting in lower reformate yield and poorer process performance.

The catalysts used in the practice of both stages (1) and (2) of this invention are generally known, as are methods of making them (see U.S. Pat. Nos. 3,218,267, 3,440,178 and 3,242,228).

U.S. Pat. No. 3,849,289 teaches a staged reforming process comprising charging a naphtha to a first reaction zone and contacting the naphtha with hydrogen in the presence of a reforming catalyst and charging the effluent to a second reforming zone. The temperature in the first zone is from about 750° F to about 850° F, and the catalyst used is the conventional platinum-alumina reforming catalyst. The distinguishing feature of the invention is the discovery of the effect of catalyst particle size in optimizing the reaction. Furthermore, although it is known that certain platinum-alumina catalysts can be used at lower temperatures (U.S. Pat. No. 3,218,267, for example, teaches the use of temperatures as low as 400° F) no patent or combination of patents suggests the process of the instant invention.

SUMMARY OF THE INVENTION

In accordance with the invention there is provided a process for upgrading a naphtha feed stock comprising the stages of (1) reforming said feed stock at from about 100° F to about 300° F by contacting said feed stock with an alumina catalyst containing a metal of the platinum group and containing from about 5 to about 15% by weight of halogen (i.e. chlorine, bromine, fluorine or iodine) therein and (2) subjecting the effluent to a further reforming stage using an alumina reforming catalyst containing platinum and having less than about 1% by weight of chlorine therein.

DESCRIPTION OF SPECIFIC EMBODIMENTS

In the conventional catalytic reforming of naphthas, three of more reactors are used, which contain the same catalyst with the same composition. Since different types of reactions, such as dehydrogenation, ring-opening, isomerization, dehydrocyclization and hydrocracking are involved in the reforming, the reactors are normally operated at different average temperatures (greater than 800° F) to optimize the efficiencies of the individual reaction steps and hence to maximize the overall aromatics yield. No low temperature operation has been practiced in the conventional reforming processes. Reforming processes with different noble metal catalysts in different reactors have been proposed, all operating at conventional reforming temperatures above 800° F.

Furthermore, it is well known that the reforming yield depends upon the feed composition, due to the fact that some components in the feed lead to certain undesirable side reactions, such as cracking to form light gases, resulting in lower reformate yield and poor process performance. Therefore, it is desirable to use a two stage process with different catalysts, operated at different conditions to optimize the overall process performance.

It has been found that such a two-stage process is most beneficially carried out by operating the first stage at low temperatures, say 100° to 300° F. In addition, any catalyst to work at this low temperature has to be very active. Conventional reforming catalysts are not active enough due to insufficient acidity. Suitable catalysts for the first stage are alumina catalysts containing a metal of the platinum group and containing increased amounts of halogens. It has been found that a chlorine content between 5 and 15% is particularly advantageous. Promotors such as hydrogen chloride and halogen-containing organic substances, added to the feed, have also been found to be beneficial.

The first stage of the process can be carried out separately as an individual entity, or it can be integrated into the existing reforming system. The pretreated naphtha, along with recycled hydrogen, is passed through the first stage converter at low temperature (100° - 300° F) and then the effluent is then heated to the reforming inlet temperatures of 850° to 950° F and charged to the reformer. If hydrogen chloride promotor is used, it can be recovered and recycled to the first stage converter.

The active chlorinated Pt/Al$_2$O$_3$ catalyst used in the first stage of this invention was found to be very responsive to hydrogen regeneration. Therefore, if it is desirable to keep the catalyst activity at the highest level, a swing reactor system can be employed, using recycle hydrogen for regeneration if desired.

The operating conditions in the first stage include a temperature of from about 100° to about 300° F, a pressure of from about 50 psig to about 1000 psig, preferably about 100 to about 600 psig, a liquid hourly space velocity (LHSV) of from about 0.1 to about 10, preferably from about 0.3 to about 2, and a hydrogen to hydrocarbon mole ratio of from about 0.5 to about 15, preferably about 1 to about 10.

Reforming operations in the second stage ordinarily will be conducted at temperatures of from about 800° to about 1000° F, preferably 850° – 975° F, pressures within the range of from about 50 to about 1000 psig, preferably about 100 – 600 and liquid hourly space velocities of from about 0.5 to about 10. The amount of hydrogen charged along with the hydrocarbons usually will be from about 0.5 to about 15 moles per mole of hydrocarbon and preferably about 1 to about 10 moles of hydrogen per mole of hydrocarbon. Any conventional reforming catalyst can be used in the second stage. These will include platinum-containing bimetallic and multimetallic catalysts. Other metals include rhenium, indium, rhodium, gold, germanium. Palladium, as the single metal, can also be used.

As has been noted, the highly chlorinated platinum alumina catalyst is prepared by methods known to the art. One such method involves contacting alumina with a compound of the general formula:

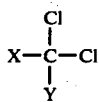

(where X and Y may be the same or different and are selected from H, Cl, Br, F or SCl, or where X and Y together may be O or S) under non-reducing conditions and at a temperature such that chlorine is taken up by the aluminum chloride. The catalyst is suitable for use in hydrocarbon conversion processes, particularly the isomerization of $C_4$ or higher paraffin hydrocarbons boiling within the gasoline boiling range, i.e., up to 400° F (204° C) at temperatures below 400° F (204° C).

The active catalyst sites are formed by reaction of the chlorinating compound with certain reactive surface groups, for example hydroxyl groups, with loss of an oxygen atom. The oxygen is given off as a compound, which, depending on the chlorinating compound used, may be carbon dioxide, phosgene, or a sulfur oxide. Water is also a reaction product, and it has been found that the production of active catalysts is accompanied by a progressive loss of hydrogen therefrom.

Another process of chlorinating the stage (1) catalyst, and the one used in the practice of this invention, involves the use of thionyl chloride ($SOCl_2$). Thionyl chloride reacts under non-reducing conditions and at a temperature of from 300° to 1100° F (149° to 593° C) such that clorine is taken up by the alumina without the production of free aluminum chloride.

Any convenient form of alumina may be used in this first stage. These will include any high surface area activated alumina, such as eta, gamma, theta and chi. These may also contain other oxides such as zirconia and silica.

Preferably the first stage catalyst contains less than about 10% by weight, and more particularly less than about 5% by weight, of a metal or metal compound having hydrogenating activity selected from the second and third rows of Group VIII of the Periodic Table. The percentage of the hydrogenating component is calculated as weight of metal to weight of total catalyst. The preferred metals are platinum and palladium, which may be present in amounts from 0.01 to 5% by weight, preferably 0.1 to 2% by weight.

The hydrogenating metal is desirable incorporated with the alumina prior to chlorination. Thus a suitable material for chlorination is one of the known platinum-alumina reforming catalysts.

The non-reducing conditions used for the chlorination may be either inert or oxidizing conditions, the latter being preferred since they yield catalysts which lose activity more slowly during low temperature isomerization. A convenient method of contacting the alumina is to pass a gaseous stream of the chlorine compound over the alumina, either alone, or preferably, in a non-reducing carrier gas. Preferred carrier gases are oxidizing gases and examples of suitable carrier gases are nitrogen, air or oxygen.

Non-reducing conditions are essential, since reducing conditions tend to convert the chlorine compound to hydrogen chloride, which gives an inactive catalyst. The temperature for the chlorination is, as stated above, from 300° – 1100° F (149° C – 593° C). The tendency to form free aluminium chloride increases with temperature and care should, therefore, be exercised when using the higher temperatures within the stated range. Since the temperatures used will normally be above the volatilization temperature of aluminium chloride the formation of free aluminium chloride is readily detected by its appearance in the gaseous reaction products. When treating a platinum group metal-alumina composite, care should also be exercised to prevent the formation of such complexes, again increasing with increasing temperature. When treating platinum group metal-alumina composites, the temperature is preferably 300° – 700° F (149° – 371° C).

Other methods of incorporating chlorine into an alumina catalyst involve the use of carbon tetrachloride, chloroform, methylene chloride and the like (see U.S. Pat. Nos. 3,440,178 and 3,242,228).

Having described the invention in general terms, the following examples are offered as specific illustrations. It is to be understood that they are illustrative only, and are not intended to limit the invention in any way.

PREPARATION OF THE HIGH CHLORINE-CONTAINING CATALYST 1. 12.5 grams of a platinum alumina catalyst comprising 0.61 percent weight platinum, 0.67 percent weight chlorine on eta-alumina, and having a surface area of 439 m²/g in the form of 30 – 60 mesh particles, were charged to a glass reactor. A downward gas flow, 140 cc/minutes of dry nitrogen at atmospheric pressure, was estabished through the reactor and the catalyst dried at 580° F for 1 hour.

2. The catalyst was reduced with hydrogen gas (at 140 cc/minute) at 580° F for 4 hours.

3. The catalyst was purged with $N_2$ at a flow rate of 140 cc/minute at 580° F for two hours and cooled down to room temperature and the flow rate of $N_2$ was reduced to 50 cc/minute for overnight.

4. The flow rate of nitrogen gas was increased to 140 cc/minute and the temperature was raised to 580° F. Then chlorination with thionyl chloride at 580° F was carried out in the following manner. Thionyl chloride was injected by a syringe pump at a rate of 2.3 cc/hour into a U-tube which was inserted in the nitrogen gas line upstream of the reactor. Thionyl chloride vapor was carried by nitrogen gas from the U-tube into the reactor where chlorination was continued for 2 hours and 20 minutes. The treated catalyst was purged with nitrogen (at 140 cc/minute) at 580° F for 2 hours and then cooled back to room temperature under nitrogen flow. Both ends of the reactor were closed for overnight standing.

5. The pretreatment was proceeded to the final step, air calcination. A purge of 375 cc/minute dry air was set up through the reactor. The catalyst bed temperature was raised from room temperature to 600° F at a rate of 250° F per hour; from 600° to 900° F at a rate of 100° F per hour; and was held at this temperature for 2 hours. After cooling down to room temperature, the resulting pretreated catalyst weight 11.1 grams. It was stored in a vacuum desiccator.

The catalyst, pretreated according to the above procedures had the following properties:

| Chlorine, percent weight | 8.71 |
|---|---|
| Platinum, percent weight | 0.55 |
| Surface area, m²/gram | 374 |

Reforming data for different feedstocks and different product octane quality are obtained with the proposed modified two-stage reforming process and compared with conventional reforming. In all examples, the first stage converter is operated at 300 psig, 300° F, 0.75 liquid hourly space velocity with a hydrogen to hydrocarbon ratio of 3 to 1.

The first stage conversion catalyst was prepared according to the procedures just described.

The reformer conditions in the second stage are 200 psig, 1.5 LHSV, 10 total recycle ratio, 3 reactors and a 3 to 1 hydrogen to hydrocarbon ratio. The catalyst is a commercial reforming catalyst containing 0.35% by weight platinum and 0.44% by weight chlorine. The temperatures are indicated in the following tables. Such temperatures are selected to obtain the same octane number of the reformate.

EXAMPLE 1

A hydrocracked naphtha feed ($C_6$-208° F) with the following properties is used:

| Specific gravity at 60° F | 0.7187 |
|---|---|
| Average molecular weight | 92.6 |
| Composition, vol.% | |
| Paraffins | 51.9 |
| Naphthenes | 46.0 |
| Aromatics | 2.1 |
| Research Octanes | |
| R + 0 | 70.9 |
| R + 3 | 87.5 |

The following results are obtained with unmodified (conventional) reforming and with modified (two-stage) reforming.

| Reforming | $C_5^+$ Octane | Inlet Temp. | $C_5^+$ Yield | $H_2$ Purity |
|---|---|---|---|---|
| | (R + 3) | (° F) | (vol.) | (mole %) |
| Unmodified | 95 | 900 | 90.8 | 90.9 |
| Modified | 95 | 872 | 92.5 | 95.5 |

As can be seen, the reforming performance of the modified process is greatly improved. The $C_5+$ yield and $H_2$ purity are both increased substantially. The lower inlet temperature possible with the modified process gives a long cycle life.

EXAMPLE 2

The feed of Example 1 is used under more severe reforming conditions by increasing the inlet temperatures to achieve a higher product octane number.

The results of reforming performance are compared below for the unmodified and the modified reforming processes:

| Reforming | $C_5^+$ Octane | Inlet Temp. | $C_5^+$ Yield | $H_2$ Purity |
|---|---|---|---|---|
| | (R + 3) | (° F) | (vol.) | (mole %) |
| Unmodified | 102 | 954 | 79.0 | 78.6 |
| Modified | 102 | 950 | 81.0 | 83.3 |

The substantial improvement in both $C_5+$ yield and $H_2$ purity for the modified process is clearly demonstrated.

EXAMPLE 3

A straight run naphtha feed ($C_6$-209° F) with the following properties is used:

| Specific gravity at 60° F | 0.7160 |
|---|---|
| Average molecular weight | 93.0 |
| Composition, vol.% | |
| Paraffins | 59.8 |
| Naphthenes | 37.5 |
| Aromatics | 2.7 |
| Research Octanes | |
| R + 0 | 66.2 |
| R + 3 | 83.6 |

The unmodified reforming and the modified reforming give the following results at a fixed $C_5+$ octane (R+3) requirement of 95.

| Reforming | $C_5^+$ Octane | Inlet Temp. | $C_5^+$ Yield | $H_2$ Purity |
|---|---|---|---|---|
| | (R + 3) | (° F) | (vol.) | (mole %) |
| Unmodified | 95 | 909 | 87.9 | 87.0 |
| Modified | 95 | 902 | 88.8 | 89.3 |

Clearly, the modified process gives better reforming performance (particularly $C_5+$ yield and the $H_2$ purity) than the conventional process.

EXAMPLE 4

The feed of Example 3 is used at higher reforming severity to achieve a higher product octane. Again, the reforming performance improvement of the modified process over the conventional process is clearly illustrated below:

| Reforming | $C_5^+$ Octane | Inlet Temp. | $C_5^+$ Yield | $H_2$ Purity |
|---|---|---|---|---|
| | (R + 3) | (° F) | (vol.) | (mole %) |
| Unmodified | 102 | 957 | 76.7 | 76.9 |
| Modified | 102 | 955 | 77.8 | 79.7 |

EXAMPLE 5

A hydrocracked naphtha feed (190° – 290° F) with the following properties is used:

| Specific gravity at 60° F | 0.7492 |
|---|---|
| Average molecular weight | 103.4 |
| Composition, vol. % | |
| Paraffins | 41.9 |
| Naphthenes | 52.8 |
| Aromatics | 5.3 |
| Research Octanes | |
| R + 0 | 64.7 |
| R + 3 | 85.1 |

The following results are obtained with unmodified reforming and with modified reforming including the converter.

| Reforming | $C_5^+$ Octane | Inlet Temp. | $C_5^+$ Yield | $H_2$ Purity |
|---|---|---|---|---|
| | (R + 3) | (° F) | (vol.) | (mole %) |
| Unmodified | 95 | 887 | 91.4 | 94.4 |
| Modified | 95 | 864 | 92.6 | 97.1 |

As shown above, the reforming performance of the modified process is substantially improved, the $C_5+$ yield and $H_2$ purity are increased, and the required inlet temperature is lower.

EXAMPLE 6

The feed of Example 5 is used under more severe reforming conditions to achieve a higher product octane number.

The improvement of the modified reforming over the unmodified reforming is reflected in the following comparison.

| Reforming | $C_5^+$ Octane | Inlet Temp. | $C_5^+$ Yield | $H_2$ Purity |
|---|---|---|---|---|
| | (R + 3) | (° F) | (vol.) | (mole %) |
| Unmodified | 102 | 944 | 83.9 | 87.8 |
| Modified | 102 | 937 | 85.1 | 90.3 |

Suitable feeds for the present invention are petroleum naphthas boiling within the range of about 130° to 400° F, preferably within 150° to 300° F. Of particular advantage is the use of hydrocracked naphtha as a feed.

We claim:

1. A process for upgrading a naphtha feed stock comprising the stages of (1) reforming said feed stock at from about 100° to about 300° F by contacting said feed stock with an alumina catalyst containing a platinum group metal selected from Group VIII of the Periodic Table and also containing from about 5 to about 15% by weight of halogen and (2) subjecting the effluent to a further reforming stage employing a platinum-containing alumina catalyst having therein less than about 1% by weight of chlorine, at a temperature of from about 850° to about 1000° F, at a pressure of from about 50 to about 1000 psig and at an LHSV of from about 0.5 to about 10.

2. The process of claim 1 wherein the alumina catalyst contains from about 0.01% to about 5% by weight of the Group VIII metal.

3. The process of claim 1 wherein the pressure in the first stage is from about 50 psig to about 1000 psig.

4. The process of claim 1 wherein in the first stage the liquid hourly space velocity is from about 0.1 to about 10.

5. The process of claim 1 wherein in the first stage the hydrogen to hydrocarbon ratio is from about 0.5 to about 15.

6. The process of claim 1 wherein the effluent from stage (1) is heated at from about 850° to about 975° F prior to charging to the reformer for stage (2).

7. The process of claim 1 wherein the catalyst used in stage (1) is chlorinated platinum-containing alumina catalyst.

8. The process of claim 1 wherein the catalyst used in stage (1) contains about 8.7% by weight of chlorine and about 0.55% by weight of platinum.

9. The process of claim 8 wherein in stage (1) operating conditions include a temperature of 300° F, a pressure of 300 psig, a LHSV of 0.75 and a hydrogen to hydrocarbon ratio of 3 to 1 and in stage (2) include a pressure of 200 psig, a LHSV of 1.5 and a hydrogen to hydrocarbon ratio of 3 to 1.

10. The process of claim 9 wherein the catalyst used in stage (2) contains 0.35% by weight of platinum and 0.44% by weight of chlorine.

* * * * *

UNITED STATES PATENT AND TRADEMARK OFFICE
CERTIFICATE OF CORRECTION

PATENT NO. : 4,049,539

DATED : September 20, 1977

INVENTOR(S) : TSOUNG Y. YAN, TRACY J. HUANG and WERNER O. HAAG

It is certified that error appears in the above-identified patent and that said Letters Patent are hereby corrected as shown below:

Column 2, line 1, "about 5 to" should read --about 5% to--.
Column 3, line 2, "about 800°" should read --about 800°F--.
Column 3, line 3, "preferably 850°" should read --preferably 850°F--.
Column 3, line 49, "from 300°" should read --from 300°F--.
Column 3, line 49, "to 1100°F (149° to--)" should read --to 1100°F (149°C to--)--.
Column 4, line 17, "from 300°" should read --from 300°F--.
Column 4, line 29, "preferably 300°" should read --preferably 300°F--.
Column 4, line 30, "to 700°F (149°--)" should read --to 700°F (149°C--)--.
Column 4, line 48, "estabished" should read --established--.
Column 5, line 5, "from 600°" should read --from 600°F--.
Column 7, line 31, "about 130°" should read --about 130°F--.
Column 7, line 32, "within 150°" should read --within 150°F--.
Column 7, line 37, "about 100°" should read --about 100°F--.
Column 8, line 1, "about 5" should read --about 5%--.
Column 8, line 6, "about 850°" should read --about 850°F--.
Column 8, line 22, "about 850°" should read --about 850°F--.

Signed and Sealed this

*Thirty-first* Day of *January 1978*

[SEAL]

Attest:

RUTH C. MASON
*Attesting Officer*

LUTRELLE F. PARKER
*Acting Commissioner of Patents and Trademarks*